United States Patent
Ryu et al.

(10) Patent No.: US 8,345,714 B2
(45) Date of Patent: Jan. 1, 2013

(54) CELL SEARCH METHOD AND APPARATUS FOR ASYNCHRONOUS MOBILE COMMUNICATION SYSTEM

(75) Inventors: Dong Ryeol Ryu, Seoul (KR); Kwang Man Ok, Hwaseong-si (KR)

(73) Assignee: Samsung Electronics Co., Ltd (KR)

( * ) Notice: Subject to any disclaimer, the term of this patent is extended or adjusted under 35 U.S.C. 154(b) by 612 days.

(21) Appl. No.: 12/556,161

(22) Filed: Sep. 9, 2009

(65) Prior Publication Data
US 2010/0061306 A1    Mar. 11, 2010

(30) Foreign Application Priority Data
Sep. 9, 2008   (KR) .................... 10-2008-0088895

(51) Int. Cl.
*H04J 3/06*    (2006.01)
(52) U.S. Cl. ........ 370/511; 370/350; 370/512; 375/142; 375/145; 375/149; 375/150
(58) Field of Classification Search .................. 370/328, 370/345, 350, 464, 498, 503, 509, 510, 511, 370/512, 513, 514; 375/130, 140, 141, 142, 375/145, 147, 149, 150
See application file for complete search history.

(56) References Cited

U.S. PATENT DOCUMENTS
7,684,472 B2 *   3/2010   Litwin et al. .................. 375/150

FOREIGN PATENT DOCUMENTS
KR     2006059119 A *   6/2006

* cited by examiner

*Primary Examiner* — Chi Pham
*Assistant Examiner* — Weibin Huang
(74) *Attorney, Agent, or Firm* — The Farrell Law Firm, P.C.

(57) ABSTRACT

A cell search method and apparatus for an asynchronous mobile communication system are provided. A Secondary Synchronization Code (SSC) correlator despreads a signal at every slot boundary in accordance with a z-sequence to output a SSC correlation value. The signal is received over a first symbol duration. A Primary Synchronization Code (PSC) correlator despreads the received signal in accordance with a PSC to output a PSC correlation value. A dot product calculator performs dot product calculation between the SSC correlation value and the PSC correlation value to output a correlation result of the SSC. A frame synchronization detector extracts frame synchronization information from the correlation result.

20 Claims, 10 Drawing Sheets

CELL SEARCH METHOD AND APPARATUS FOR ASYNCHRONOUS MOBILE COMMUNICATION SYSTEM

PRIORITY

This application claims priority under 35 U.S.C. §119(a) to an application entitled "CELL SEARCH METHOD AND APPARATUS FOR ASYNCHRONOUS MOBILE COMMUNICATION SYSTEM" filed in the Korean Intellectual Property Office on Sep. 9, 2008 and assigned Serial No. 10-2008-0088895, the content of which are incorporated herein by reference.

BACKGROUND OF THE INVENTION

1. Field of the Invention

The present invention relates generally to a mobile communication system and, more particularly, to a cell search method and apparatus for an asynchronous mobile communication system.

2. Description of the Related Art

Unlike a synchronous mobile communication system in which the timing of cells are synchronized with reference to a global reference time provided by a Global Positioning System (GPS), an asynchronous mobile communication system, such as a Universal Mobile Telecommunication System (UMTS), does not require its cells to be synchronized, but the mobile terminal is synchronized with a serving cell. In order to acquire timing synchronization with a cell operating asynchronously, the mobile terminal performs a cell search procedure. The cell search procedure is typically carried out in three steps: slot synchronization, frame synchronization and code-group identification, and scrambling-code identification. During the first step, the mobile terminal acquires slot synchronization with the cell by using a Primary Synchronization Channel (P-SCH) that is spread with a Synchronization Code (SC). During the second step, the mobile terminal acquires frame synchronization and identifies a code group of the cell found in the first step using a Secondary Synchronization Channel (S-SCH). During the third step, the mobile terminal determines a primary scrambling code used by the found cell within the code group. Through this three-step cell search procedure, the mobile terminal acquires timing synchronization with a cell in the asynchronous mobile communication system.

In a mobile communication system, frequency offset occurs through a difference in frequencies at which the local oscillators of the base station and the mobile terminal operate and frequency fading due to the mobility of the mobile terminal. When a mobile terminal that is equipped with an inaccurate local oscillator moves quickly, the frequency offset is likely to increase significantly. Since the three-step cell search procedure is carried out without frequency offset compensation, the frequency offset is one of the main factors that influences the performance of the cell search procedure. In the asynchronous mobile communication system, such as UMTS, it is impossible to estimate the frequency offset using pilot signals over a Common Pilot Channel (CPICH) in the initial cell search step. Methods for estimating the frequency offset using the P-SCH, which is common to all cells, as the pilot signals and compensating the estimated frequency offset by adjusting a Voltage Controlled Oscillator (VCO) or a Numerically Controlled Oscillator (NCO) have been provided. However, such a coherent estimation method requires an additional frequency offset estimation circuit and a frequency adjustment device, and thus increases implementation complexity. In order to avoid the complexity of the coherent estimation method and secure reliable performance insensitive to the frequency offset, an energy calculation-based asynchronous estimation method has been considered.

FIG. 1 is a block diagram illustrating a conventional cell search apparatus for the second step of a multi-step cell search procedure in mobile communication system.

Referring to FIG. 1, the conventional cell search apparatus for the second step of the multi-step cell search procedure consists of an S-SCH correlation block 110, an energy calculator 120, a memory 130, a Secondary Synchronization Code (SSC) sequence decoder 140, and a maximum detection block 150. The S-SCH correlation block 110 includes a z-sequence generator 111, a multiplier 112, an accumulator 114, and a Fast Hadamard Transformer (FHT) 116. If a received signal is input, the S-SCH correlation block 110 correlates the signal received during the first 256 chips (i.e. Synchronization Channel (SCH) duration) of every slot with 16 SSCs using the slot timing acquired at the slot synchronization step. Since the SSC is generated by multiplying a z-sequence and a Hadamard sequence, the correlation between the received signal and the SSC is carried out in two sub-steps. Specifically, the z-sequence generator 111 outputs a z-sequence, and the multiplier 112 disperses by multiplying the received signal corresponding to the first 256 chips of every slot by the z-sequence output by the z-sequence generator 111. The multiplier 112 removes the z-sequence from the received signal and outputs a de-spread signal. The accumulator 114 accumulates the de-spread signal output by the multiplier 112 per 16 chips and outputs 16-bit sequences. The FHT 116 performs 4-stage fast Hadamard transformation on the 16-bit sequence and outputs correlation values to the 16 SSCs.

The energy calculator 120 calculates the energies of the 16 correlation values output by the FHT 116 and outputs the calculated energies. The energy can be expressed as a sum of the squares of correlation values of an I-channel and a Q-channel. The memory 130 stores the correlation values calculated with the energies by slot. The SSC sequence decoding block 140 extracts the correlation values of the SSC indicated by the S-SCH codeword with reference to the S-SCH codeword, and accumulates the correlation values. The maximum value detection block 150 extracts a codeword having the maximum accumulated value among the accumulated values, a scrambling code group number corresponding to a number of cyclic shifts of the codeword, and frame boundary information.

As described above, the conventional noncoherent detection method for a cell search calculates correlation energy using the correlation results and accumulates the correlation energy. It is advantageous in reducing the complexity compared to the coherent detection method based on the frequency offset removal, however it degrades the performance. When the frequency offset is large, the conventional noncoherent detection method must reduce the synchronization accumulation length, which causes further degradation of detection performance.

SUMMARY OF THE INVENTION

The present invention has been made to address at least the above problems and/or disadvantages and to provide at least the advantages described below. Accordingly, an aspect of the present invention provides a cell search method and apparatus for an asynchronous mobile communication system that is capable of improving cell search performance.

According to one aspect of the present invention, a cell search apparatus for an asynchronous mobile communication system includes a Secondary Synchronization Code (SSC) correlator which despreads a signal at every slot boundary in accordance with a z-sequence to output a SSC correlation value. The signal is received over a first symbol duration. The system also includes a Primary Synchronization Code (PSC) correlator which despreads the received signal in accordance with a PSC to output a PSC correlation value, and a dot product calculator which performs dot product calculation between the SSC correlation value and the PSC correlation value to output a correlation result of the SSC. The system further includes a frame synchronization detector which extracts frame synchronization information from the correlation result.

According to another embodiment of the present invention, a cell search method for an asynchronous mobile communication system is provided. A signal is despread at every slot boundary by correlating the signal with a z-sequence to output a Secondary Synchronization Code (SSC) correlation value. The signal is received over a first symbol duration. The signal is despread by correlating the signal with a Primary Sequence Code (PSC) to output a PSC correlation value. Dot product calculation is performed between the SSC correlation value and PSC correlation value to output a correlation result of the SSC. Frame synchronization information is extracted from the correlation result.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
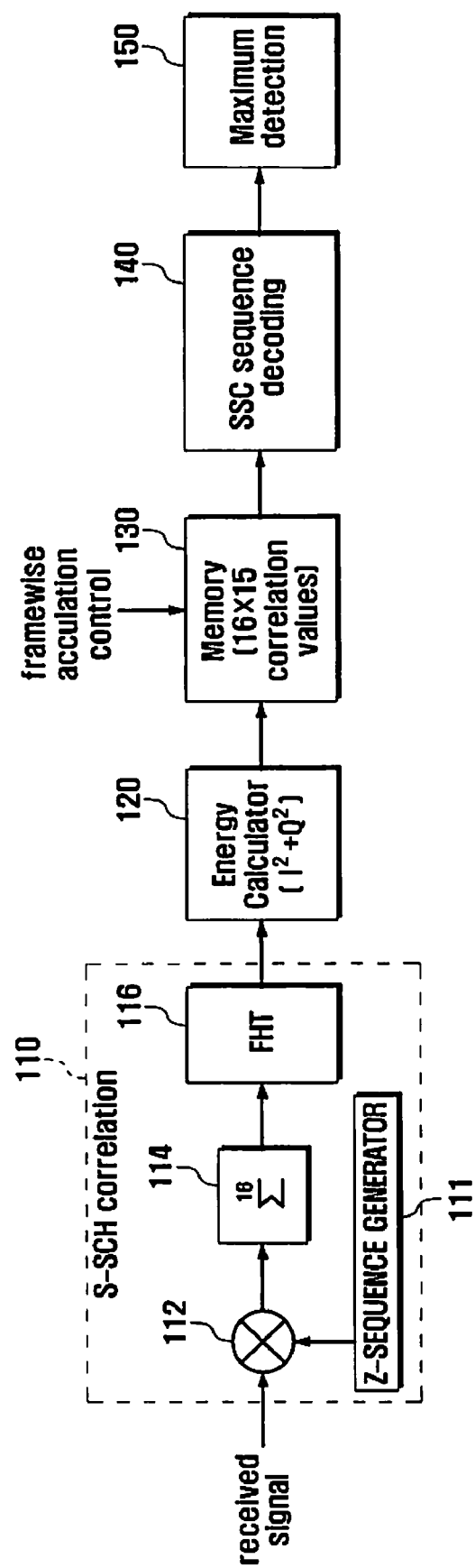
FIG. 1 is a block diagram illustrating a conventional cell search apparatus for the second step of the multi-step cell search procedure in mobile communication system.

Embodiments of the present invention are described in detail with reference to the accompanying drawings. The same or similar components may be designated by the same or similar reference numerals to refer to the same or similar parts although they are illustrated in different drawings. Detailed descriptions of constructions or processes known in the art may be omitted to avoid obscuring the subject matter of the present invention.

The terms and words used in this specification and claims shall not be understood as limited to their dictionary meanings. Based on the principle that an inventor can adequately define terms to best describe his/her invention, the terms and words shall be interpreted as conforming to the technical spirit of the present invention. Accordingly, the examples and drawings disclosed in the specification are only exemplary ones and there may be various equivalents and modifications at the time of the application for patent of this invention.

In the following description, the cell search method and apparatus of the present invention is described in association with the UMTS as an asynchronous mobile communication system using the three-step cell search procedure. However, the present invention is not limited thereto and can be applied to various types of mobile communication systems operating with the three-step cell search procedure.

In UMTS, a base station (hereinafter, also referred to as a "Node B") is assigned a cell specific code and identified by the cell specific code. Assuming that a UMTS network comprises 512 cells each having a Node B, 512 cell specific codes are used for identifying the individual cells, i.e. Node Bs.

In order to connect to a UMTS network, a mobile terminal (hereinafter, also referred to as a "User Equipment (UE)") searches all 512 Node Bs for a serving Node B. The UE should inspect the phases of all the cell specific codes assigned to the 512 Node Bs to search for the serving cell, resulting in long cell search delay. Since it is very inefficient to adopt such a cell search algorithm having large cell search delay into a UMTS network composed of a large number of base stations, the multi-step cell search algorithm has been proposed for the UMTS network. In the multi-step cell search algorithm, the base stations (e.g., 512 base stations) are divided into a number of base station groups (e.g., 64 groups, group 0~group 63). The base station groups are assigned distinct group specific codes, and each base station group consists of eight base stations. The eight base stations are assigned different codes for spreading the CPICH such that the mobile terminal can find the serving cell with the scrambling code for spreading the CPICH.

The multi-step cell search procedure includes a first step in which the mobile terminal receives the P-SCH and acquires the slot timing to a cell by detecting maximum power in the received P-SCH, a second step in which the mobile terminal finds frame synchronization and identifies the code group of the cell found in the first step using the S-SCH and slot timing information, and a third step in which the mobile terminal determines the exact primary scrambling code used by the found cell through symbol-by-symbol correlation over the CPICH with all codes within the code group identified in the second step.

The scrambling code is a unique code assigned to the cell in the asynchronous system for the mobile terminal to identify its serving cell. Each cell is assigned a unique downlink scrambling code. The downlink scrambling codes include primary scrambling codes and secondary scrambling codes. Since the primary scrambling codes are used for code detection, the primary scrambling code is referred to as the "scrambling code" hereinafter. As described above, 512 scrambling codes can be used and subdivided into 64 groups each having 8 codes. Each cell transmits SCHs spread by an SC for fast cell search. The SCHs include the P-SCH and S-SCH. The P-SCH provides the slot synchronization information, and the S-SCH provides the frame synchronization (code phase synchronization) information and code group information. This information is acquired through the SCHs, and the mobile terminal can determine the final scrambling code using the CPICH.

Figure 2:
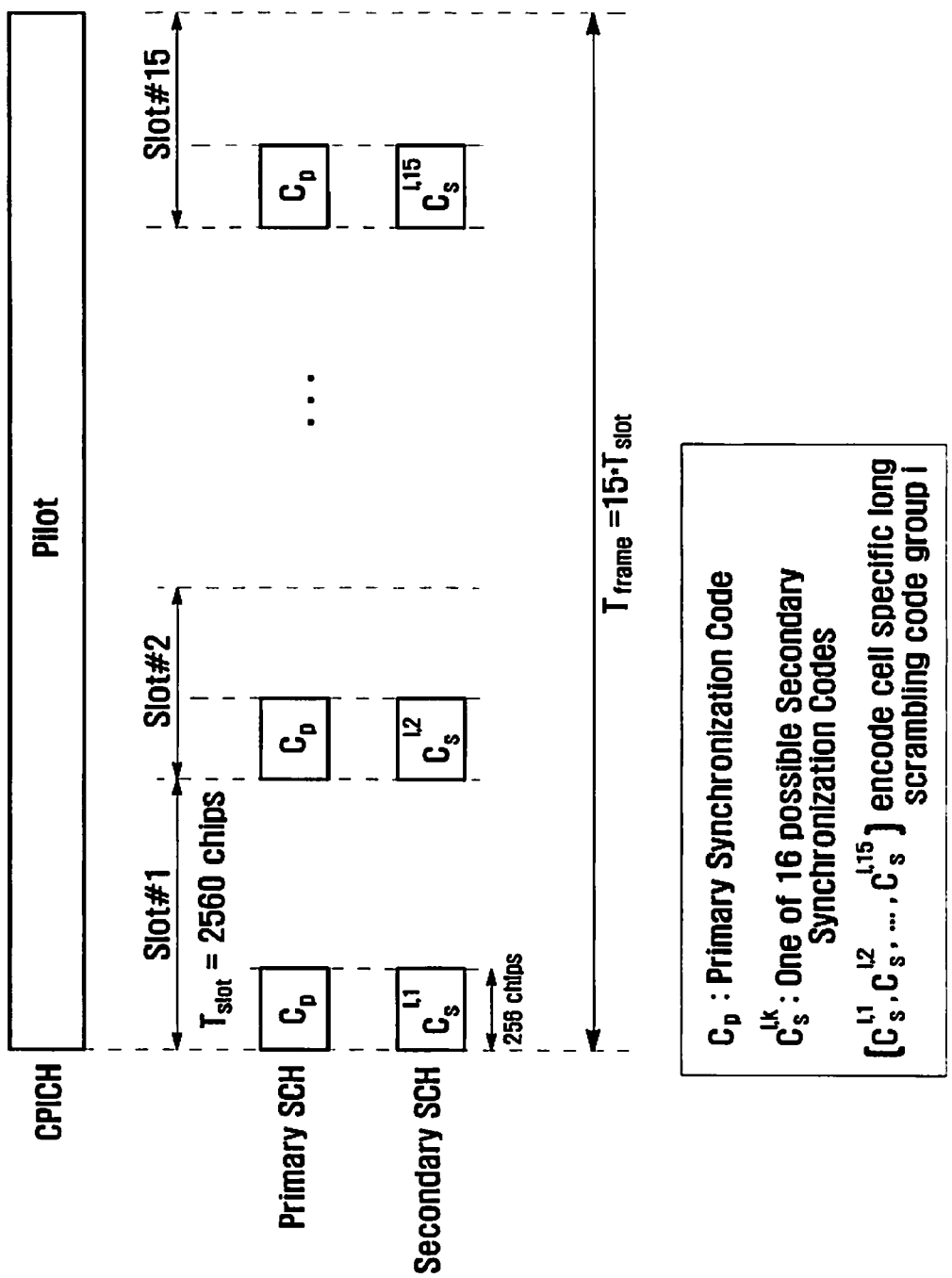
FIG. 2 is a diagram illustrating a structure of the SCH radio frame of UMTS, according to an embodiment of the present invention.

FIG. 2 is a diagram illustrating a structure of the SCH radio frame of the UMTS, according to an embodiment of the present invention. A Node B transmits the synchronization channel to the UE as shown in FIG. 2.

In the UMTS network, a cell search apparatus of the UE uses the SCH and CPICH for synchronization purposes. The SCH is a downlink signal used for cell search and consists of two sub-channels, i.e. P-SCH and S-SCH. The 10 ms radio frame of the P-SCH and S-SCH are divided into 15 slots, each having a length of 2560 chips, whereby the radio frame consists of 38400 chips. The P-SCH is the same for every cell in the system (e.g., 512 base stations), and is transmitted in the form of Primary Synchronization Code (PSC) ($C_p$). The P-SCH consists of a modulated code having a length of 256 chips, which is 1/10 of each slot. The UE acquires the slot synchronization with a cell using the P-SCH transmitted by the Node B. The Node B transmits the S-SCH in parallel with the P-SCH. The S-SCH repeatedly transmits a 15 length sequence of modulated codes each having a length of 256 chips, specifically, the SSC. The SSC is denoted as $C_s^{i,k}$, where $i=0, 1, \ldots, 63$ is the number of the scrambling code groups (i.e., the number of base stations), and $k=0, 1, \ldots, 14$ is the slot number. Each SSC is chosen from a set of 16 different codes having a length of 256 chips. The sequence on the S-SCH indicates which of the code groups the cell's downlink scrambling code belongs to. The code group denotes the group of codes generating the base station group codes. Also, the S-SCH consists of modulated code of 256 chips, which is 1/10 of each slot. The UE finds frame synchronization and identifies the code group of the cell using the S-SCH transmitted by the Node B.

The synchronization codes, PSC and SSC, used for spreading SCH are described in detail below. First, the PSC sequence, "a", is defined as follows:

$$a = <x1, x2, x3, \ldots, x16> = <1,1,1,1,1,1,-1,-1,1,-1,1,-1,1,1,-1,-1,1>$$

The PSC can be expressed by Equation (1), when the chips are transmitted in order of left to right.

$$C_p = (1+j)^* <a,a,a,-a,-a,a,-a,-a,a,a,a,-a,a,-a,a,a> \quad (1)$$

The SSC, $\{C_s,1, \ldots, C_s,16\}$, is produced by position-wise multiplication of the z-sequence and Hadamard sequence. The z-sequence is defined as follows:

$$z = <b,b,b,-b,b,b,-b,-b,b,b,-b,-b,b,-b,b,-b>,$$

where $b = <x1, x2, x3, x4, x5, x6, x7, x8, -x9, -x10, -x11, -x12, -x13, -x14, -x15, -x16>$.

Accordingly, sequence "a" and sequence "b" are orthogonal. The Hadamard sequence can be obtained by a retroactively generated matrix H8 expressed as equation (2).

$$H_k = \begin{pmatrix} H_{k-1} & H_{k-1} \\ H_{k-1} & H_{k-1} \end{pmatrix}, k \geq 1 \quad H_0 = (1) \quad (2)$$

The rows are enumerated from the top down starting with 0 for the first row (the row containing only ones). The Hadamard sequence is the $n^{th}$ row ($n=0, 1, \ldots 255$) of matrix H8. The $C_{s,k}$ ($k=0, 1, \ldots, 15$) as the $k^{th}$ SSC can be calculated using Equation (3) below.

$$C_{s,k} = (1+j)^* <hm(0)^*z(0), hm(1)^*z(1), hm(2)^*z(2), \ldots, hm(255)^*z(255)> \quad (3)$$

where $m=16*k$, and the chips are transmit in order of left to right.

As aforementioned, the sequence "a" and sequence "b" are orthogonal with each other. A total of $2^{18}-1=262,143$ scrambling codes, numbered 0 to 262,142 can be generated. However, not all the scrambling codes are used. The scrambling codes are divided into 512 sets, each having a PSC and 15 SSCs. Among them, the PSCs are related to the code detection and can be expressed as Equation (4).

$$\text{primary scrambling code}(n) = 16*i \text{ where } i=0 \ldots 511 \quad (4)$$

The set of primary scrambling codes is further divided into 64 scrambling code groups, each consisting of 8 PSCs. The $j^{th}$ scrambling code group consists of PSCs $16*8*j+16*k$, where $j=0 \ldots 63$ and $k=0 \ldots 7$. Each cell is allocated one PSC. In the third step of the multi-step cell search procedure, the UE obtains the PSCs of the respective cells so as to acquire synchronization with the cell.

Cell search procedures that use a PSC and SSC that are orthogonal to search for a cell, without sensitivity to frequency offset in the second step are described in detail below.

First Embodiment

Figure 3:
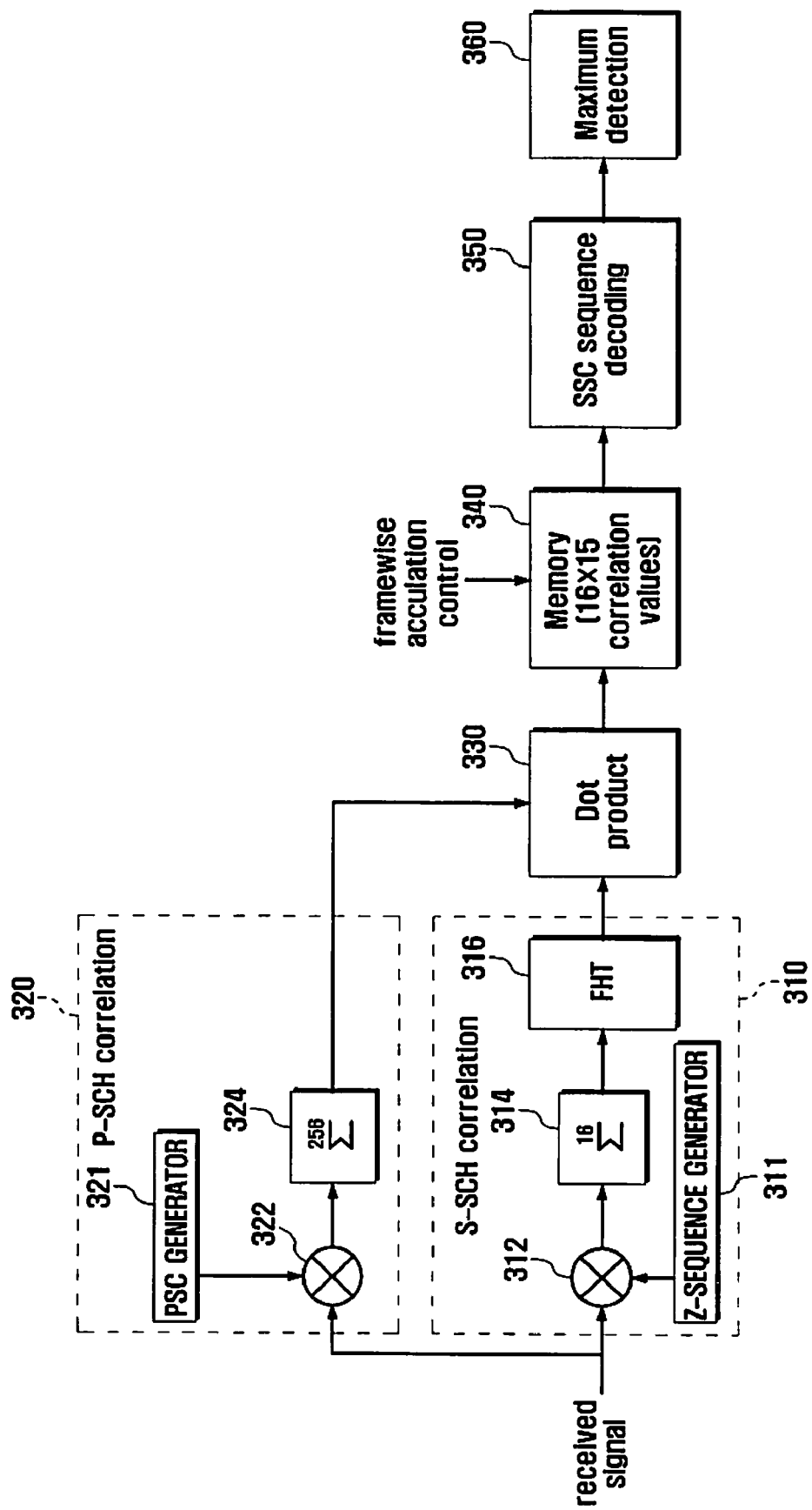
FIG. 3 is a block diagram illustrating a configuration of a cell search apparatus for searching a cell at the second step of the multi-step cell search procedure, according to a first embodiment of the present invention.
Figure 4:
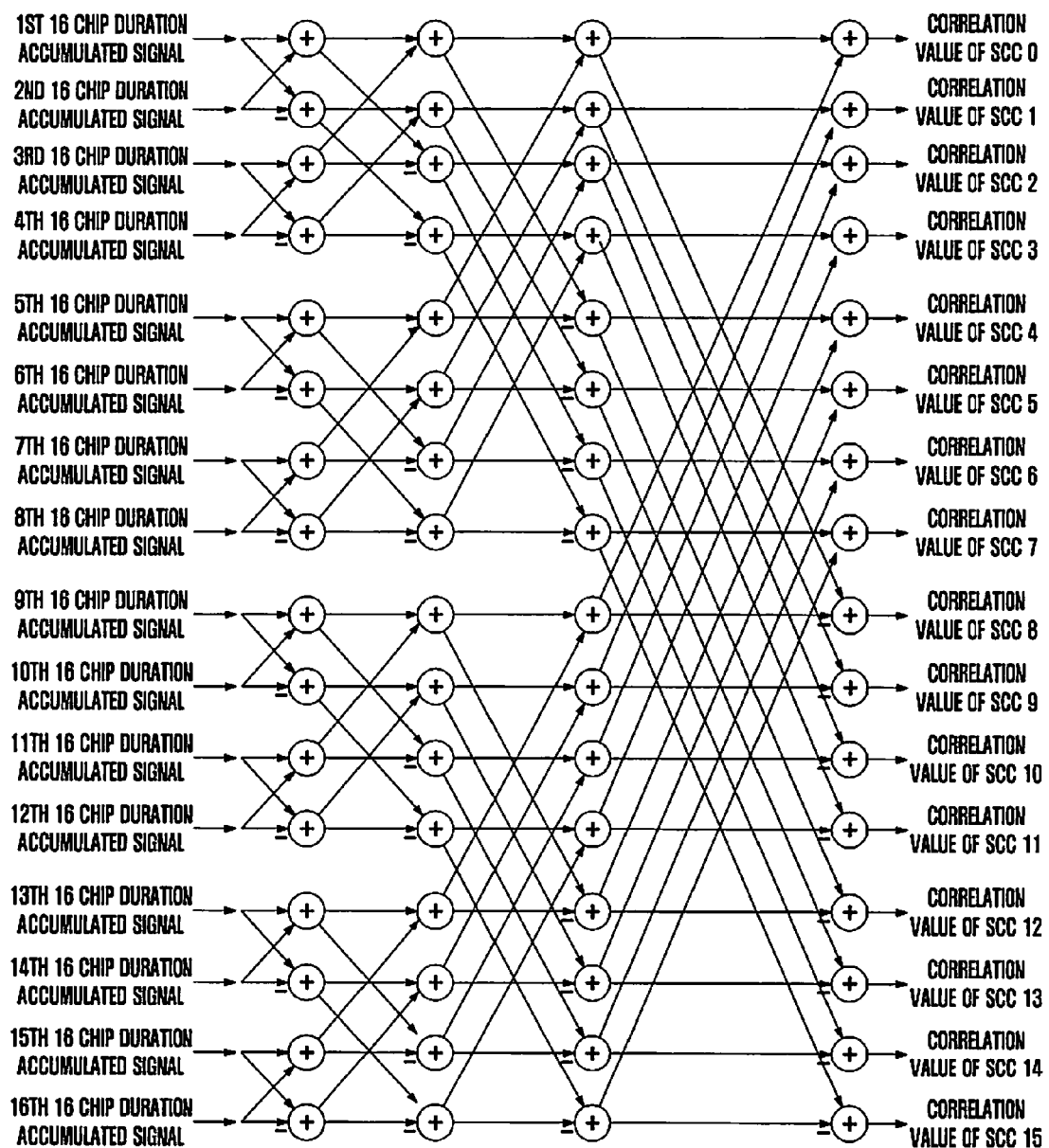
FIG. 4 is a diagram illustrating a configuration of an FHT of FIG. 3.
Figure 5:
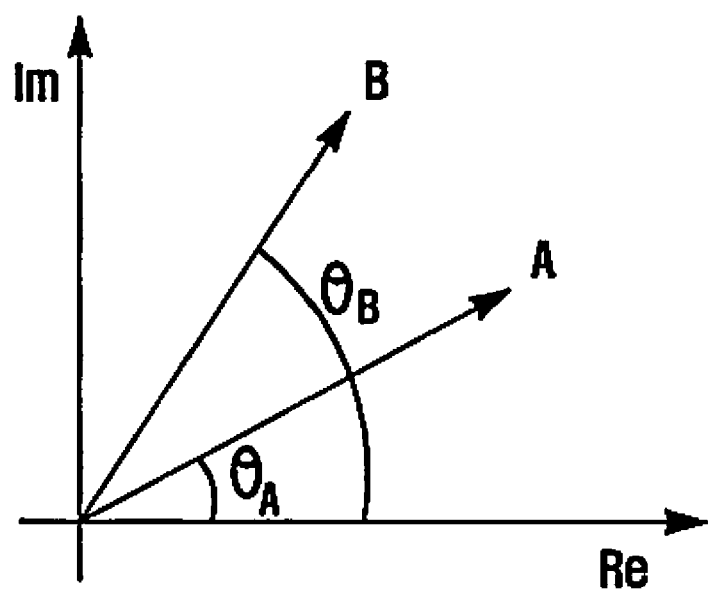
FIG. 5 is a diagram illustrating a correlation for performing inner product calculation, according to an embodiment of the present invention.

FIG. 3 is a block diagram illustrating a configuration of a cell search apparatus for searching a cell at the second step of the multi-step cell search procedure, according to a first embodiment of the present invention. FIG. 4 is a diagram illustrating a configuration of an FHT of FIG. 3. FIG. 5 is a diagram illustrating correlation for performing inner product calculation, according to an embodiment of the present invention. and FIG. 8 is a flowchart illustrating a cell search method at the second step of multi-step cell search procedure for a mobile communication system, according to the first embodiment of the present invention.

Referring to FIGS. 3-5 and 8, the cell search apparatus for performing the second step of the multi-step cell search procedure, according to the first embodiment of the present invention, includes an SSC correlator 310, a PSC correlator 320, a dot product calculator 330, a memory 340, an SSC sequence decoder 350, and a maximum value detector 360. The SSC correlator 310 includes a z-sequence generator 311, a multiplier 312, an accumulator 314, and an FHT 316. The PSC correlator 320 includes a PSC generator 321, a multiplier 322, and an accumulator 324.

During the second step of the multi-step cell search procedure, the SSC correlator 310 multiplies the signal received at the slot boundary (i.e. at the beginning of each slot) by the z-sequences per chip unit, accumulates the multiplication results during a 16 chip duration, and performs Hadamard sequence correlation on the 16 length sequence to output correlation result values. While correlating the z-sequence and Hadamard sequences at the SSC correlator 310 in the SSC correlation duration, the PSC correlator 320 performs correlation on the PSC. Specifically, the SSC correlator 310 correlates the signals received over the 256-chip duration at the beginning of each slot and the 16 SSCs using the slot timing acquired at the first step of the multi-step cell search procedure. Since the SSC is a multiplication of the Hadamard sequence by a z-sequence, the received signal is correlated by the z-sequence and Hadamard sequence.

Figure 8:
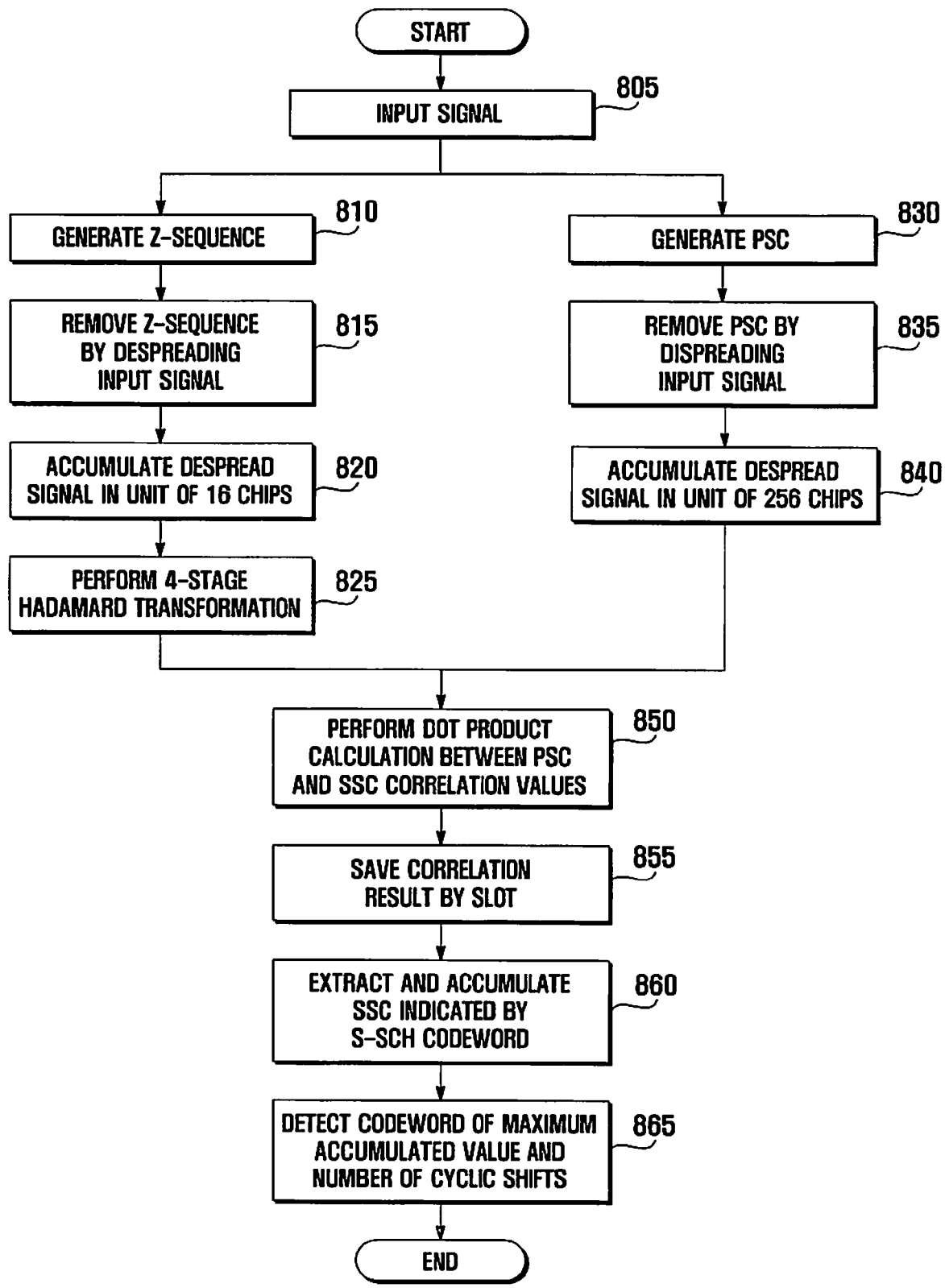
FIG. 8 is a flowchart illustrating a cell search method at the second step of the multi-step cell search procedure for a mobile communication system, according to the first embodiment of the present invention.

If a signal is input at step 805 of FIG. 8, the z-sequence generator 311 generates and outputs a z-sequence in step 810, the multiplier 312 despreads the signal received over the 256-chip duration at the beginning of each slot by multiplying with the z-sequence output from the z-sequence generator 311 in step 815. Specifically, the multiplier 312 outputs the z-sequence-removed signal. The accumulator 314 accumulates the despreads signal per 16 chips and outputs a 16-length sequence in step 820. The FHT 316 performs 4-stage fast Hadamard transformation on the 16-length sequence output by the accumulator 314 and outputs the correlation values of the 16 SSCs in step 825. FIG. 4 shows how to perform 4-stage fast Hadamard transformation. The FHT 316 is configured as shown in FIG. 4, and composed of a large number of adders.

The PSC generator 321 of the PSC correlator 320 generates and outputs the PSC used in the first step of the multi-step cell search procedure in step 830. The multiplier 322 despreads the signal received over the 256-chip duration at the beginning of each slot by multiplying the signal with the PSC output from the PSC generator 321 in step 835. Specifically, the multiplier 322 outputs the PSC-removed signal. The accumulator 324 accumulates the despread signal per 256 chips and outputs 256-length sequence in step 840.

The dot product calculator 330 performs the dot product of the 16 SSC correlation values output from the FHT 316 and the PSC correlation values output from the accumulator 324 to output 16 dot products in step 850. Referring to FIG. 5, for a vector A or a vector B in complex space, let |A| or |B| be the norm of A or B (i.e., $|A|=sqrt(Re(A)^2+Im(A)^2)$, $|B|=sqrt(Re(B)^2+Im(B)^2)$), and $\theta_A$ or $\theta_b$ be the phase of $\theta_A$ or $\theta_b$ (i.e., $\theta_A=arctan(Im(A)/Re(A))$, $\theta_B=arctan(Im(B)/Re(B))$). The inner product of A and B can be expressed as shown in Equation (5).

$$AYB = |A||B_i|\cos(\theta_A - \theta_{B_i}) = A\cos\theta_A B_i\cos\theta_{B_i} + A\sin\theta_A B_i\sin\theta_{B_i} \quad (5)$$

In FIG. 5 and Equation (5), A denotes a PSC correlation result value and $B_j$ is $i^{th}$ SSC correlation result value (i=1 ... 16). Since the P-SCH and S-SCH are transmitted in parallel so as to experience the same channel response, the phases of the P-SCH and S-SCH are identical with each other. Assuming no noise, the phase difference between the two channels is zero. Accordingly, the inner product of the two channels is acquired by Equation (5) with the correlation size between the received signal and the PSC and the correlation size between the received signal and the SSC regardless of the phases of the two channels.

The memory 340, SSC sequence decoder 350, and maximum value detector 360 extract the frame synchronization information, i.e., the scrambling group number and frame boundary information, from the SSC correlation result output by the dot product calculator 330. Specifically, the memory 340 saves the correlation result value of the 16 SSCs, which are obtained by dot product calculation, by slot in step 855. When using more than one frame, the value obtained by summing the correlation result values of the slots at the same position of the frames is stored. The memory 340 accumulates the values of slots of the frames at the same position under the frame-wise accumulation control. Since the SSC correlation results are accumulated in synchronous manner, the cell search method according to the first embodiment of the present invention is superior to the conventional energy accumulation-based cell search method in performance. The SSC sequence decoder 350 extracts the correlation value of the SSC indicated by the S-SCH codeword of every slot with reference to the S-SCH codewords of the SSC correlation values of all the slots and accumulates the SSC correlation values in step 860. The maximum value detector 360 extracts the codeword having the maximum value among the accumulated values and a number of cyclic shift times of the codeword in step 865. The scrambling code group number and the frame boundary information can be obtained according to the extracted codeword and the number of cyclic shift times.

As described above, the final SSC correlation result is dependent on only the correlation sizes between the received signal and PSC, and between the received signal and SSC, regardless of the frequency offset. Thus, it is possible to perform the cell search procedure without sensitivity to the frequency offset. Meanwhile, since the calculation is made per 256 chips, the correlation values can be reduced in a large frequency offset environment due to the variation of the phase in a single SCH duration. In this case, the reduction of the correlation values can be prevented by dividing the SCH duration, i.e., reducing the correlation period. This correlation period reduction method is described in the second embodiment of the present invention.

Second Embodiment

Figure 6:
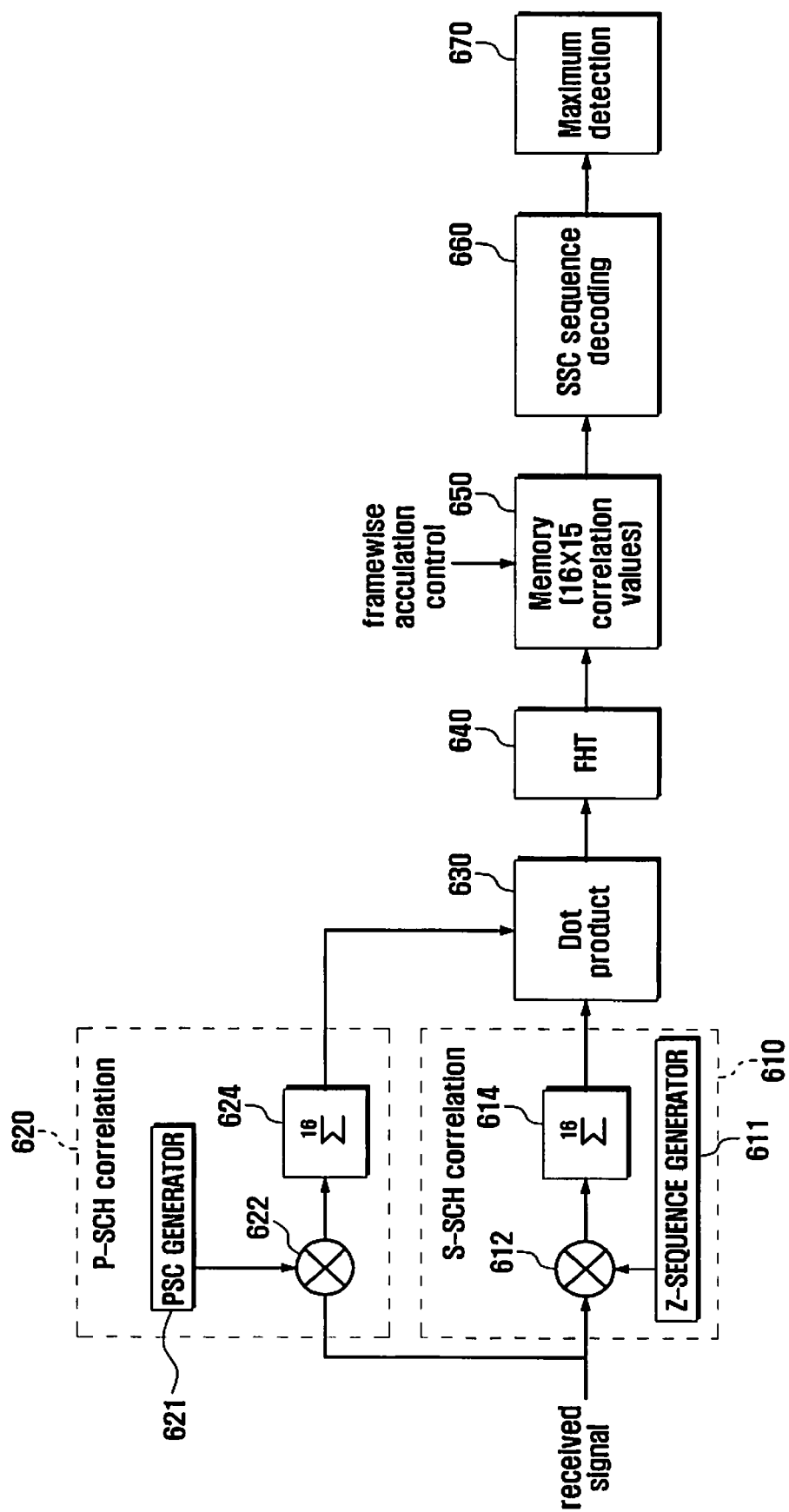
FIG. 6 is a block diagram illustrating a configuration of a cell search apparatus for searching a cell at the second step of the multi-step cell search procedure, according to a second embodiment of the present invention.
Figure 9:
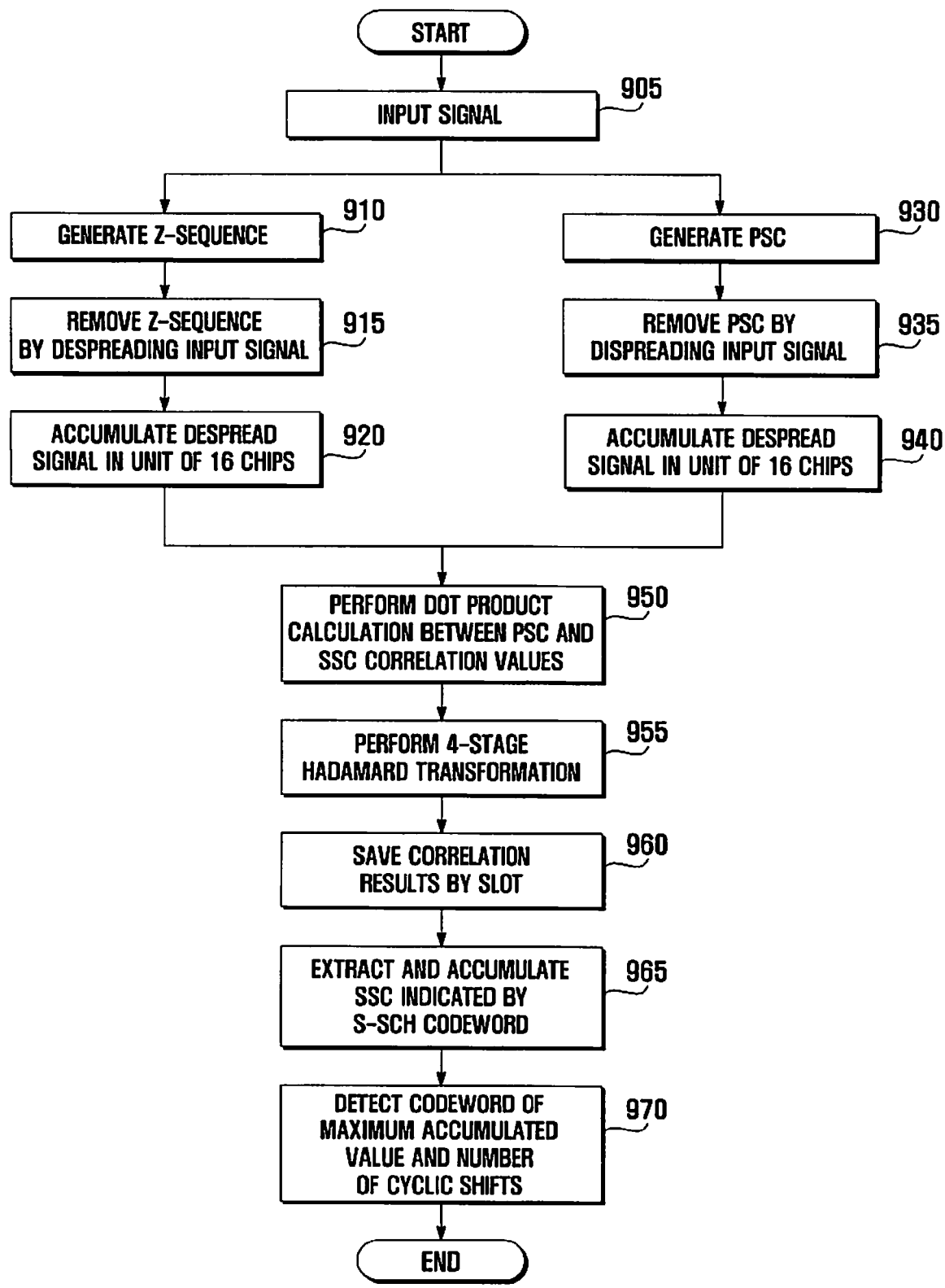
FIG. 9 is a flowchart illustrating a cell search method at the second step of the multi-step cell search procedure for a mobile communication system, according to the second embodiment of the present invention.

FIG. 6 is a block diagram illustrating a configuration of a cell search apparatus for searching a cell at the second step of the multi-step cell search procedure, according to the second embodiment of the present invention. FIG. 9 is a flowchart illustrating a cell search method at the second step of the multi-step cell search procedure for a mobile communication system, according to the second embodiment of the present invention.

Referring to FIGS. 6 and 9, the cell search apparatus for performing the second step of the multi-step cell search procedure, according to the second embodiment of the present invention includes an SSC correlator 610, a PSC correlator 620, a dot product calculator 630, an FHT 640, a memory 650, an SSC sequence decoder 660, and a maximum value detector 670. The SSC correlator 610 includes a z-sequence generator 611, a multiplier 612, and an accumulator 614. The PSC correlator 620 includes a PSC generator 621, a multiplier 622, and an accumulator 624.

As aforementioned, the PSC sequence "a" and the SSC sequence "b" have lengths of 16 chips and are orthogonal with each other, such that the PSC and SSC can be correlated per 16 chips. During the second step of the multi-step cell search procedure, the SSC correlator 610 multiplies the signal received at the slot boundary (i.e., at the beginning of each slot) by the z-sequence on a per chip basis and accumulates the multiplication result during the 16-chip duration. The PSC correlator 620 multiplies the signal received at the slot boundary by the PSC on a per chip basis and accumulates the multiplication result during the 16 chip duration.

If a signal is input at step 905 of FIG. 9, the z-sequence generator 612 generates and outputs a z-sequence in step 910, and the multiplier 612 despreads the signal received over the 256-chip duration at the beginning of each slot by the z-sequence output from the z-sequence generator 611 in step 915.

Specifically, the multiplier 612 outputs the z-sequence-removed signal. The accumulator 614 accumulates the despread signal per 16 chips and outputs 16-length sequence in 920. The PSC generator 621 of the PSC correlator 620 generates and outputs the PSC used in the first step of the multi-step cell search procedure in step 930. The multiplier 622 despreads the signal received over the 256-chip duration at the beginning of each slot by multiplying the signal with the PSC output from the PSC generator 621 in step 935. Specifically, the multiplier 622 outputs the PSC-removed signal. The accumulator 624 accumulates the despread signal per 16 chips and outputs 16-length sequence in step 940. Here, no phase variation caused by a frequency offset can be assumed during the 16-chip duration.

The dot product calculator 630 performs the dot product of the SSC correlation values output from the accumulator 614 and the PSC correlation values output from the accumulator 624 in step 950. The inner product of the SSC correlation value and the PSC correlation value can be expressed as shown in FIG. 5 and Equation (5). The calculations of the SSC correlation value and PSC correlation value are performed in the same manner as described in the first embodiment of the present invention.

As aforementioned, with reference to FIG. 5 and Equation (5), the P-SCH and the S-SCH are transmitted in parallel to experience the same channel response, thereby having the same phase. Assuming no noise, the phase difference between the two channels is zero. Thus, the phases are removed by calculating the inner product of the SSC correlation values and the PSC correlation values. The phase-removed inner product values are output to the FHT 640, such that the FHT 640 performs Hadamard sequence correlation on the inner product values per 16 chips and outputs correlation results of the final 16 SSC sequences in step 955.

The memory 650, the SSC sequence decoder 660, and the maximum value detector 670 extract the frame synchronization, i.e., the scrambling group number and frame boundary information, from the SSC correlation result output by the FHT 640. Specifically, the memory 650 saves the correlation result value of the 16 SSCs, which are obtained by dot product calculation, by slot in step 960. When using more than one frame, the value obtained by summing the correlation result values of the slots at the same position of the frames is stored. The memory 650 accumulates the values of slots of the frames at the same position under the frame-wise accumulation control. Since the SSC correlation results are accumulated in a synchronous manner, the cell search method, according to the second embodiment of the present invention, is superior to the conventional energy accumulation-based cell search methods in performance. The SSC sequence decoder 660 extracts the correlation value of the SSC indicated by the S-SCH codeword of every slot with reference to the S-SCH codewords of the SSC correlation values of all the slots and accumulates the SSC correlation values in step 965. The maximum value detector 670 extracts the codeword having the maximum value among the accumulated values and a number of cyclic shift times of the codeword in step 970. The scrambling code group number and the frame boundary information can be obtained according to the extracted codeword and the number of cyclic shift times.

As described above, the final SSC correlation result is dependent on only the correlation sizes between the received signal and PSC, and between the received signal and SSC regardless of the frequency offset. Thus, it is possible to perform the cell search procedure without sensitivity to the frequency offset. Also, since the correlation period is reduced to a 16-chip duration, it is possible to avoid a reduction of the correlation values by the phase variation, resulting in improvement of performance even in the large frequency offset environment.

A configuration of the cell search apparatus for achieving the advantages of the first and second embodiments of the present invention is described in the third embodiment of the present invention.

Third Embodiment

Figure 7:
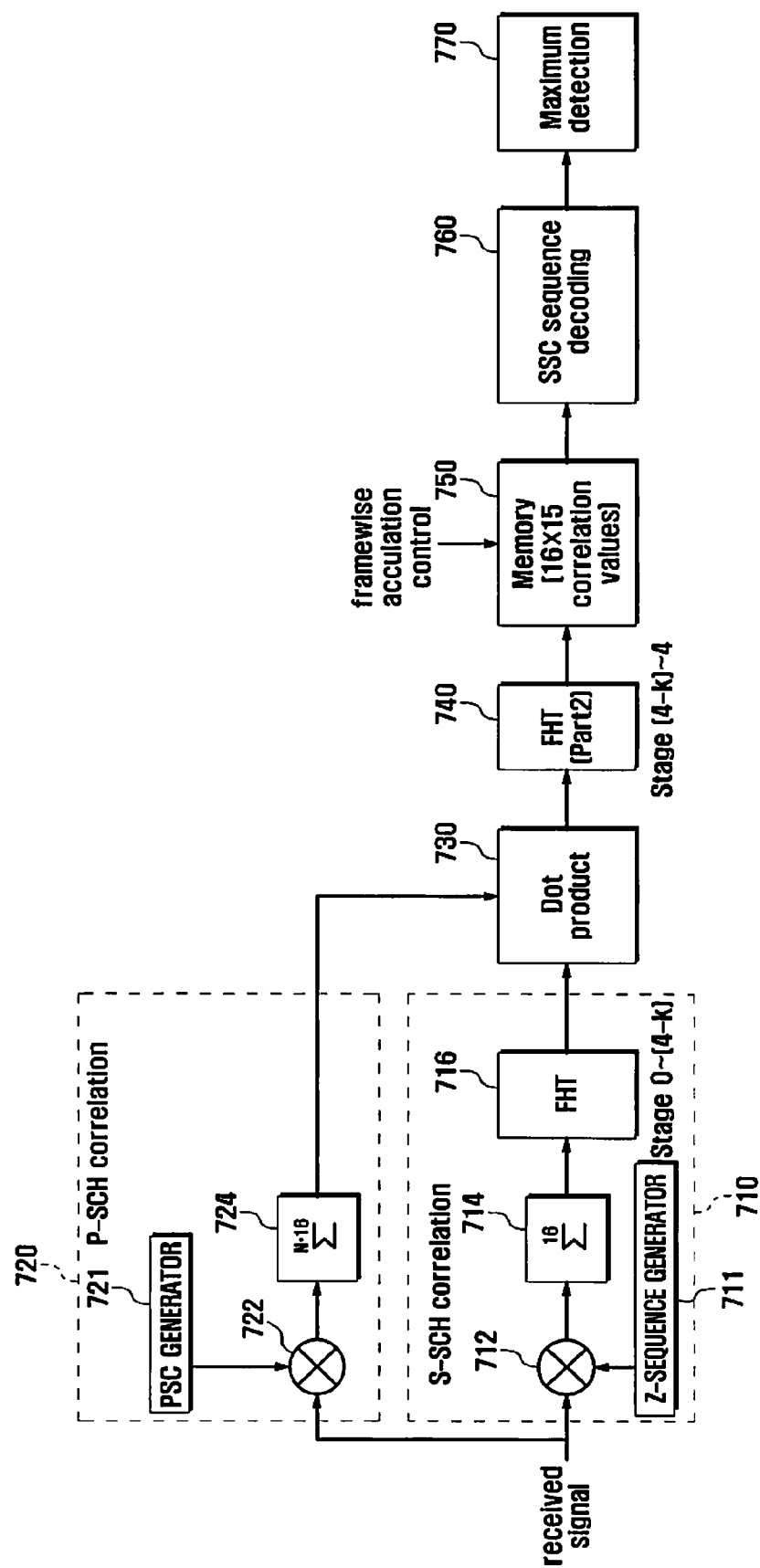
FIG. 7 is a block diagram illustrating a configuration of a cell search apparatus for searching a cell at the second step of the multi-step cell search procedure, according to a third embodiment of the present invention.
Figure 10:
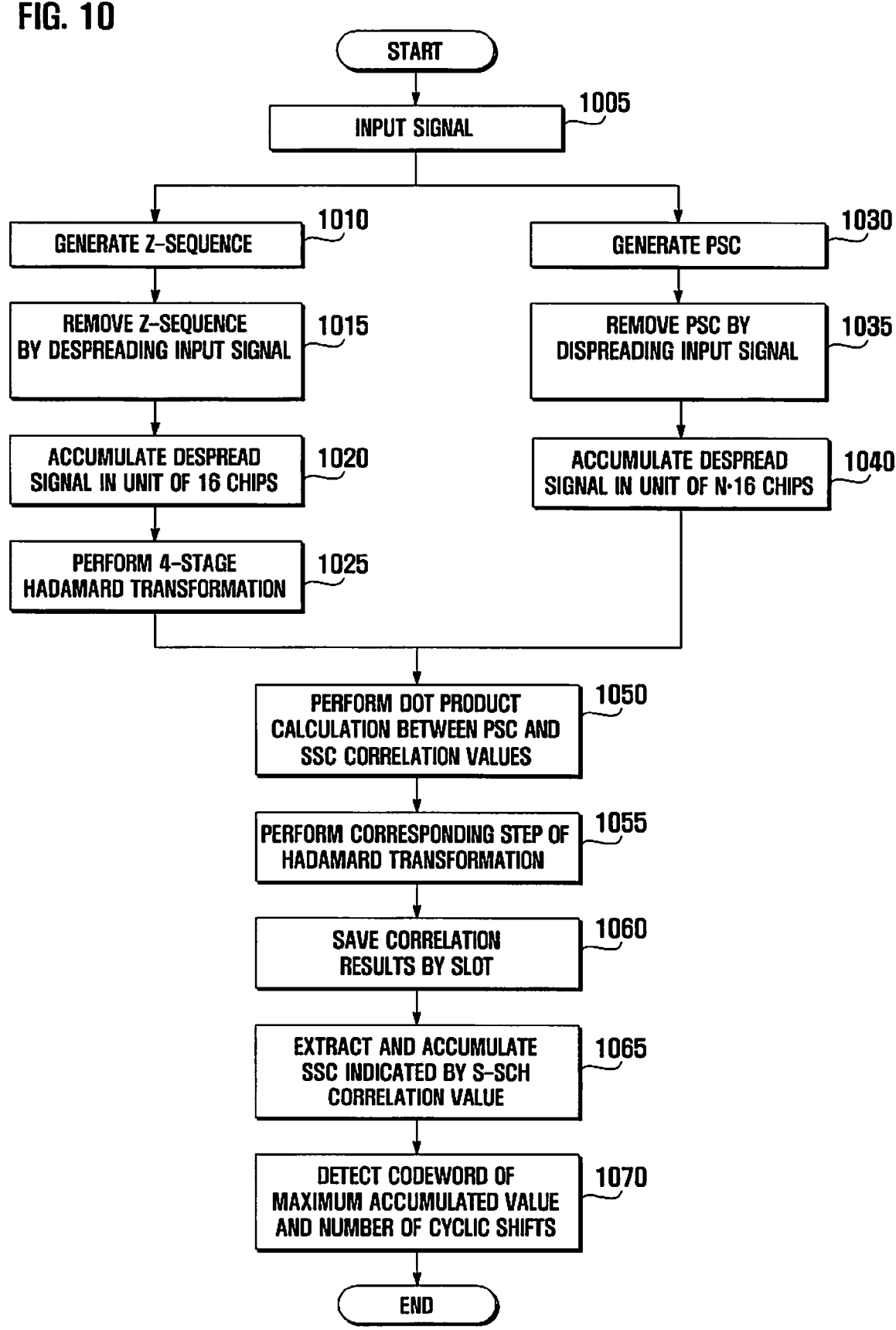
FIG. 10 is a flowchart illustrating a cell search method at the second step of the multi-step cell search procedure for a mobile communication system, according to the third embodiment of the present invention.

FIG. 7 is a block diagram illustrating a configuration of a cell search apparatus for searching a cell at the second step of the multi-step cell search procedure, according to the third embodiment of the present invention. FIG. 10 is a flowchart illustrating a cell search method at the second step of the multi-step cell search procedure for a mobile communication system, according to the third embodiment of the present invention.

Referring to FIGS. 7 and 10, the cell search apparatus for performing the second step of the multi-step cell search procedure, according to the third embodiment of the present invention, includes an SSC correlator 710, a PSC correlator 720, a dot product calculator 730, a second FHT 740, a memory 750, an SSC sequence decoder 760, and a maximum value detector 770. The SSC correlator 710 includes a z-sequence generator 711, a multiplier 712, an accumulator 714, and a first FHT 716. The PSC correlator 720 includes a PSC generator 721, a multiplier 722, and an accumulator 724.

As aforementioned, the PSC sequence "a" and the SSC sequence "b" have lengths of 16 chips and are orthogonal with each other, such that the PSC and SSC can be correlated per 16 chips. During the second step of the multi-step cell search procedure, the SSC correlator 710 multiplies the signal received at the slot boundary (i.e. at the beginning of each slot) by the z-sequence on a per chip basis and accumulates the multiplication result during the 16-chip duration.

If a signal is input at step 1005 of FIG. 10, the z-sequence generator 711 generates and outputs a z-sequence in step 1010, the multiplier 712 despreads the signal received over the 256-chip duration at the beginning of each slot by the z-sequence output from the z-sequence generator 711 in step 1015. Specifically, the multiplier 712 outputs the z-sequence-removed signal. The accumulator 714 accumulates the despread signal per 16 chips and outputs a 16-length sequence in step 1020. The first FHT 716 performs fast Hadamard transformation on the 16-length sequence output by the accumulator 714 to the corresponding stage (stage 0~(4-k)) of 4 stages and outputs the correlation values of the 16 SSCs in step 1025. The first FHT 716 is configured with a corresponding number of stages from the configuration, as shown in FIG. 4. Specifically, the first FHT 716 performs the fast Hadamard transformation to the 4-k stages as the first part of FFT of FIG. 4. The rest of the stages are performed by the second FHT 740. Here, k is dependent on the number of PSC chips accumulated at the accumulator 724 of the PSC correlator 720, and the number of chips can be selected as N multiple of 16 ($N=2^{(4-k)}$, k=0, 1, 2, 3, 4). A determination of the number of chips to be selected is described in greater detail below.

The PSC generator 721 of the PSC correlator 720 generates and outputs the PSC used in the first step of the multi-step cell search procedure in step 1030. The multiplier 722 despreads the signal received over the 256-chip duration at the beginning of each slot by multiplying the signal with the PSC output from the PSC generator 721 in step 1035. Specifically, the multiplier 722 outputs the PSC-removed signal. The accumulator 724 accumulates the despread signal per a predetermined number of chips and outputs a 16-length sequence in step 1040.

The number of chips can be N*16 where N=$2^{(4-k)}$ (k=0, 1, 2, 3, 4). When the number of chips is 256, N=16 and N=$2^{(4-k)}$ (k=0, 1, 2, 3, 4) and thus k=0. If k=0, the number of fast Hadamard transformation stages (4-k) is 4 such that the first FHT 716 performs the 4-stage Hadamard transformations, as in the first embodiment of the present invention. Since the first FHT 716 performs the 4-stage FHT, the second FHT 740 does not perform FHT. When the number of chips is set to 16, N=1 and N=$2^{(4-k)}$ (k=0, 1, 2, 3, 4) and thus k=4. If k=4, the number of fast Hadamard transformation station (4-k) is 0, such that the first FHT 716 does not perform fast Hadamard transformation and the second FHT 740 performs the 4-stage Hadamard transformations, as in the second embodiment of the present invention. In this manner, k is set to one of 0, 1, 2, 3, and 4 and, as a consequence, the numbers of fast Hadamard transformation stages of the first FHT 716 and the second FHT 740. Thus, the first and second FHTs 716 and 740 perform the fast Hadamard transformation stages determined by k.

The dot product calculator 730 performs the dot product of the SSC correlation values output from the first FHT 716 or the accumulator 714 and the PSC correlation values output from the accumulator 724 in step 1050. The inner product of the SSC correlation value and the PSC correlation value can be expressed as shown in FIG. 5 and Equation (5). The calculations of the SSC correlation value and PSC correlation value are performed in the same manner as described in the first embodiment of the present invention.

As aforementioned with reference to FIG. 5 and Equation (5), the P-SCH and the S-SCH are transmitted in parallel so as to experience the same channel response, thereby having the same phase. Assuming no noise, the phase difference between the two channels is zero. Thus, the phases are removed by calculating the inner product of the SSC correlation values and the PSC correlation values. The phase-removed inner product values are output to the second FHT 740, such that the second FHT 740 performs Hadamard sequence correlation on the inner product values per 16 chips at the (4-k) stage(s) that are not performed in the first FHT 716 and outputs correlation results of the final 16 SSC sequences in step 1055.

The memory 750, the SSC sequence decoder 760, and the maximum value detector 770 extract the frame synchronization, i.e., the scrambling group number and frame boundary information, from the SSC correlation result output by the second FHT 740 or the dot product calculator 730. Specifically, the memory 750 saves the correlation result value of the 16 SSCs, which are obtained by dot product calculation, by slot in step 1060. When using more than one frame, the value obtained by summing the correlation result values of the slots at the same position of the frames is stored. The memory 750 accumulates the values of slots of the frames at the same position under the frame-wise accumulation control. The SSC sequence decoder 760 extracts the correlation value of the SSC indicated by the S-SCH codeword of every slot with reference to the S-SCH codewords of the SSC correlation values of all the slots, and accumulates the SSC correlation values in step 1065. The maximum value detector 770 extracts the codeword having the maximum value among the accumulated values and a number of cyclic shift times of the codeword in step 1070. The scrambling code group number and the frame boundary information can be obtained according to the extracted codeword and the number of cyclic shift times.

As described above, the cell search method and apparatus according to the third embodiment of the present invention adjusts the correlation sizes between the received signal and PSC, and between the received signal and SSC regardless of the frequency offset and according to the frequency offset environment, thereby improving cell search performance regardless of the frequency offset.

While the invention has been shown and described with reference to certain embodiments thereof, it will be understood by those skilled in art that various changes in form and detail may be made therein without departing from the spirit and scope of the present invention, as defined in the appended claims.

What is claimed is:

1. A cell search apparatus for an asynchronous mobile communication system, comprising:
    a Secondary Synchronization Code (SSC) correlator which despreads a signal at every slot boundary in accordance with a z-sequence to output an SSC correlation value, wherein the signal is received over a first symbol duration;
    a Primary Synchronization Code (PSC) correlator which despreads the received signal in accordance with a PSC to output a PSC correlation value;
    a dot product calculator which performs a dot product calculation between the SSC correlation value and the PSC correlation value to output a correlation result of the SSC; and
    a frame synchronization detector which extracts frame synchronization information from the correlation result, wherein the SSC correlator comprises a secondary accumulator which accumulates the despread signal per a predetermined number of chips to output an accumulated signal, and the PSC correlator comprises a primary accumulator which accumulates the despread signal per an N multiple of the predetermined chips, to output an accumulated signal, wherein N is a natural number.

2. The cell search apparatus of claim 1, wherein the predetermined number is 16.

3. The cell search apparatus of claim 1, wherein the N is $2^{(4-k)}$ (k=0, 1, 2, 3, 4).

4. The cell search apparatus of claim 3, wherein the SSC correlator comprises, when k=0, a 4-stage fast Hadamard transformer which performs Hadamard sequence correlation to the accumulated signal.

5. The cell search apparatus of claim 3, further comprising, when k=4, a 4-stage fast Hadamard transformer which performs Hadamard sequence correlation to the correlation result of the SSC output by the dot product calculator.

6. The cell search apparatus of claim 3, wherein, when k=1, 2, or 3, the apparatus further comprises a second fast Hadamard transformer which performs a first corresponding number of stages of Hadamard sequence correlation to the correlation result of the SSC output by the dot product calculator, and the SSC correlator comprises a first fast Hadamard transformer which performs a second corresponding number of stages of Hadamard sequence correlation to the accumulated signal.

7. The cell search apparatus of claim 3, wherein the dot product calculator performs dot product calculation between the SSC correlation value and the PSC correlation value using $AYB = A \cos\theta_A B_i \cos\theta_{B_i} + A \sin\theta_A B_i \sin\theta_{B_i}$ where A is the PSC correlation value and $B_i$ is $i^{th}$ SSC correlation value (i=1 . . . 16), and the SSC and PSC correlation values are orthogonal.

8. The cell search apparatus of claim 7, wherein the SSC correlator comprises:

a z-sequence generator which generates the z-sequence; and a multiplier which despreads the received signal by multiplying the z-sequence with the received signal on a per chip basis.

9. The cell search apparatus of claim 8, wherein the PSC correlator comprises:

a PSC generator which generates the PSC; and a multiplier which despreads the received signal by multiplying the PSC with the received signal on a per chip basis.

10. The cell search apparatus of claim 9, wherein the frame synchronization detector comprises:

a memory which saves the correlation results of the SSC output from the dot product calculator by slot;

an SSC sequence decoder which extracts correlation results of the SSC indicated by an SSC codeword with reference to SSC codewords among the saved correlation results and accumulates the extracted correlation results; and a detector which detects a codeword having a maximum value among the accumulated correlation results and acquires a scrambling code group and frame boundary information from the maximum value.

11. A cell search method for an asynchronous mobile communication system, comprising:

despreading a signal at every slot boundary by correlating the signal with a z-sequence to output a Secondary Synchronization Code (SSC) correlation value, wherein the signal is received over a first symbol duration;

despreading the signal by correlating the signal with a Primary Sequence Code (PSC) to output a PSC correlation value;

performing a dot product calculation between the SSC correlation value and PSC correlation value to output a correlation result of the SSC; and extracting frame synchronization information from the correlation result, wherein despreading a signal at every slot boundary comprises accumulating the despread signal per a predetermined number of chips to output an accumulated signal, and despreading the signal by correlating the signal with a PSC comprises accumulating the despread signal per an N multiple of the predetermined chips, to output an accumulated signal, wherein N is a natural number.

12. The cell search method of claim 11, wherein the predetermined number is 16.

13. The cell search method of claim 11, wherein the N is $2^{(4-k)}$ (k=0, 1, 2, 3, 4).

14. The cell search method of claim 13, wherein despreading a signal at every slot boundary comprises, when k=0, performing a 4-stage fast Hadamard sequence correlation to the accumulated signal.

15. The cell search method of claim 13, further comprising, when k=4, performing a 4-stage fast Hadamard sequence correlation to the correlation result of the SSC output by the dot product calculation.

16. The cell search method of claim 13, wherein, when k=1, 2, or 3, further comprising performing a first corresponding number of stages of Hadamard sequence correlation to the correlation result of the SSC output by the dot product calculation, and despreading a signal at every slot boundary slot comprises performing a second corresponding number of stages of Hadamard sequence correlation to the accumulated signal.

17. The cell search method of claim 13, wherein the dot product calculation between the SSC and PSC correlation values is performed using $AYB = A \cos \theta_A B_i \cos \theta_{B_i} + A \sin \theta_A B_i \sin \theta_{B_i}$, where A is the PSC correlation value and $B_i$ is $i^{th}$ SSC correlation value (i=1 . . . 16), and the SSC and PSC correlation values are orthogonal.

18. The cell search method of claim 17, wherein despreading a signal at every slot boundary comprises:

generating the z-sequence; and despreading the received signal by multiplying the z-sequence with the received signal on a per chip basis.

19. The cell search method of claim 18, wherein despreading the signal by correlating the signal with a PSC comprises:

generating the PSC; and despreading the received signal by multiplying the PSC with the received signal on a per chip basis.

20. The cell search method of claim 19, wherein extracting frame synchronization information comprises:

saving the correlation results of the SSC output from the dot product calculation by slot;

extracting correlation results of the SSC indicated by an SSC codeword with reference to SSC codewords among the saved correlation results and accumulating the extracted correlation results; and detecting a codeword having a maximum value among the accumulated correlation results and acquiring a scrambling code group and frame boundary information from the maximum value.

* * * * *